(12) United States Patent
Caminada et al.

(10) Patent No.: US 12,391,376 B2
(45) Date of Patent: Aug. 19, 2025

(54) TAIL ROTOR HEAD OF A ROTARY WING AIRCRAFT AND BLADE HOLDER

(71) Applicant: Kopter Group AG, Mollis (CH)

(72) Inventors: Mario Caminada, Ernetschwil (CH); Michal Skrzynski, Zürich (CH)

(73) Assignee: Kopter Group AG (CH)

( * ) Notice: Subject to any disclaimer, the term of this patent is extended or adjusted under 35 U.S.C. 154(b) by 90 days.

(21) Appl. No.: 17/923,156

(22) PCT Filed: Apr. 16, 2021

(86) PCT No.: PCT/EP2021/059970
§ 371 (c)(1),
(2) Date: Nov. 3, 2022

(87) PCT Pub. No.: WO2021/223984
PCT Pub. Date: Nov. 11, 2021

(65) Prior Publication Data
US 2023/0348052 A1    Nov. 2, 2023

(30) Foreign Application Priority Data

May 6, 2020    (CH) ..................................... 00537/20

(51) Int. Cl.
*B64C 27/82*    (2006.01)
*B64C 27/48*    (2006.01)

(52) U.S. Cl.
CPC .............. *B64C 27/82* (2013.01); *B64C 27/48* (2013.01); *B64C 2027/8254* (2013.01)

(58) Field of Classification Search
CPC ....... B64C 27/008; B64C 27/82; B64C 27/48; B64C 2027/8254
See application file for complete search history.

(56) References Cited

U.S. PATENT DOCUMENTS

| | | | |
|---|---|---|---|
| 4,540,340 A * | 9/1985 | Pariani | B64C 27/008 416/134 A |
| 4,655,657 A * | 4/1987 | Duran | F16B 21/10 411/21 |

(Continued)

FOREIGN PATENT DOCUMENTS

| | | |
|---|---|---|
| CN | 109533317 B | 10/2020 |
| EP | 0880876 A1 | 11/1995 |

(Continued)

OTHER PUBLICATIONS

English Language Translation of EP0680876A1.

(Continued)

*Primary Examiner* — Joshua J Michener
*Assistant Examiner* — Cindi M Curry
(74) *Attorney, Agent, or Firm* — Lerner David LLP

(57) ABSTRACT

A tail rotor head of a rotary wing aircraft is disclosed, the tail rotor head having at least a pitch control unit and a tail rotor hub, wherein a multiplicity of tail rotor blade holders are arranged to be connectable while reaching through openings in the tail rotor hub and the pitch control unit at the tail rotor head. The tail rotor blade is detachably connected at a first side of the tail rotor blade holder and a tension torsion strap is detachably mounted at a second side of the tail rotor blade holder. The tension torsion strap runs from the tail rotor head at least partly through the tail rotor blade holder radially outward in a direction of the tail rotor blade, thereby allowing for easy replacement of single rotor blades and a more simplified maintenance of the tail rotor head.

8 Claims, 5 Drawing Sheets

(56) References Cited

U.S. PATENT DOCUMENTS

| | | | |
|---|---|---|---|
| 5,163,817 A | 11/1992 | Violette et al. | |
| 5,415,525 A * | 5/1995 | Desjardins | B64C 27/82 |
| | | | 416/168 R |
| 5,542,818 A | 8/1996 | Monvaillier et al. | |
| 6,715,711 B1 * | 4/2004 | Muylaert | B64C 27/82 |
| | | | 244/1 R |
| 7,097,427 B2 * | 8/2006 | Kuhns | B64C 27/008 |
| | | | 416/500 |
| 7,118,343 B2 * | 10/2006 | Loftus | B64C 27/473 |
| | | | 416/500 |
| 8,500,407 B1 * | 8/2013 | Kennedy | B64C 27/48 |
| | | | 416/209 |
| 2005/0254947 A1 * | 11/2005 | Loftus | B64C 27/473 |
| | | | 416/144 |
| 2012/0087797 A1 | 4/2012 | Kuntze-Fechner | |
| 2014/0299709 A1 | 10/2014 | D'Anna | |
| 2018/0135728 A1 * | 5/2018 | Paulson | B64C 11/008 |
| 2021/0147073 A1 * | 5/2021 | Ries | B64C 27/78 |
| 2022/0274692 A1 * | 9/2022 | Haldeman | B64C 27/35 |
| 2023/0348052 A1 * | 11/2023 | Caminada | B64C 27/48 |

FOREIGN PATENT DOCUMENTS

| | | |
|---|---|---|
| EP | 3315403 | 5/2018 |
| EP | 3424818 B1 | 12/2020 |
| JP | 3209256 B2 | 7/2001 |
| JP | 2011224705 A | 11/2011 |
| JP | 2017100620 A | 6/2017 |
| KR | 100651617 B | 12/2006 |
| WO | WO93/02918 | 2/1993 |

OTHER PUBLICATIONS

English Language Translation of EP3315403A1.
International Search Report for PCT/EP2021/059970 mailed on Jun. 30, 2021 from the European Patent Office.
Japanese office action of Dec. 26, 2023 incl. english translation.
JP 2017-100620; English translation.
JP 2011224705A; English translation.
KR 100651617B; English translation.
CN 109533317; English translation.
Search Report dated Apr. 23, 25 from the Office Action for Chinese Application No. 202180032978.4 issued Apr. 25, 2025. 2 pgs.

* cited by examiner

TAIL ROTOR HEAD OF A ROTARY WING AIRCRAFT AND BLADE HOLDER

CROSS REFERENCE TO RELATED APPLICATIONS

This application is an United States national phase entry of international application number PCT/EP2021/059970 which claims priority to Swiss patent application number 00537/20, the content of both of which is herein incorporated by reference.

BACKGROUND OF THE INVENTION

Field of the Invention

The present invention is directed to a tail rotor head of a shrouded tail rotor of a rotary wing aircraft. The tail rotor head comprises at least a pitch control unit and a tail rotor hub. A multiplicity of tail rotor blade holders are connectable while reaching through openings in the tail rotor hub and the pitch control unit at the tail rotor head. The tail rotor blade is detachably connected at a first side of the tail rotor blade holder and a tension torsion strap is detachably mounted at a second side of the tail rotor blade holder. The tension torsion strap runs from the tail rotor head at least partly through the tail rotor blade holder radially outward in direction of the tail rotor blade, as well as a blade holder for detachably fixing of a tail rotor blade in a tail rotor hub on a first side and holding a tension torsion strap and connected to a pitch control unit on a second side.

Description of Related Art

From EP3315403 a tail rotor blade attachment device or blade holder is known, the tail rotor blade comprising a blade holder with an essentially tube-like shape. A tail rotor blade is attached directly at one connection eye of a tension torsion strap, wherein the tension torsion strap partially protrudes through the blade holder. The tail rotor blade and the blade holder are connected with the second connection eye of the tension torsion strap at a rotor hub in which a pitch control unit is inserted, wherein the parts are covered by a hub cap. The tube-like blade holder includes a pitch horn or control lever, connected to a part of the pitch control unit, and the blade holder is flanged in the inside of the hub. Accordingly, the blade holder, the tension torsion strap, and the whole tail rotor blade can be deflected while the rotary wing aircraft is operating. The tube-like blade holder and the tension torsion strap are at least partly inserted in the hub and additionally internally mounted for stability reasons. An overview of the prior art is shown in FIG. 6, showing FIG. 9 of EP3315403. A compact structure is reached, exhibiting high stability with maintenance being of no issue when designing the tail rotor head. The prior art does not focus on easy blade replacement nor the flexibility of selecting freely a most suitable material for both parts.

The tube-like blade holder, the connected tension torsion strap and the tail rotor blades can only be removed from the tail rotor head, after removing a cover of the tail rotor hub and disassembling of almost all components mentioned.

Due to the complicated structure and the concealed or hidden attachment of the components at the tail rotor head, which is usually covered, in practice, maintenance work becomes difficult. The known tail rotor blade attachment device is always covered in a rotor hub under a rotor hub cap, when connection of the tail rotor blade, blade holder and tension torsion strap are completed. The maintenance and especially the replacement of a single tail rotor blade is only possible after many work steps have been carried out.

SUMMARY OF THE INVENTION

An object of the present invention is to create a shrouded tail rotor head of a rotary wing aircraft with a multiplicity of tail rotor blade attachment devices and a tail rotor blade attachment device, allowing easy replacement of single rotor blades, a more simplified maintenance of the tail rotor head and therewith of the rotary wing aircraft.

No further components, such as hub caps, rotor hubs or control spiders have to be removed or disassembled in order to replace a single tail rotor blade individually by use of simplified fastening means. Accordingly, the maintenance effort will be significantly reduced. Furthermore, the disposed position of the blade attachment and the extension of one of the blade bolts provides for easy balancing of the rotor head and in particular the tail rotor.

Parts of the tail rotor blade attachment device are accessible at any time from outside of the tail rotor head and in particular the tail rotor hub. A further possibility is enabled, namely, connecting at least one balancing weight to the blade holder to balance the tail rotor after installation of all tail rotor blades at the tail rotor hub.

The disclosed split design of the blade holder is more focused on easy blade replacement and the flexibility to select freely a most suitable material for both parts, such as composite fibre reinforced plastics for the blades and metals, including aluminium, for the blade holder.

BRIEF DESCRIPTION OF THE SEVERAL VIEWS OF THE DRAWINGS

Further advantages, features, and details of the various embodiments of this disclosure will become apparent from the ensuring description of a preferred exemplary embodiment and with the aid of the drawings. The features and combinations of features recited below in the description, as well as the features and feature combination shown after that in the drawing description or in the drawings alone, may be used not only in the particular combination received, but also in other combinations on their own, without departing from the scope of the disclosure.

Further understanding of various aspects of the invention can be obtained by reference to the following detailed description in conjunction with the associated drawings, which are described briefly below.

It should be noted that in the figures, which are not always representing different embodiments, the same parts are provided with the same reference symbols or the same component names. The disclosures contained in the entire description being able to be applied analogously to the same parts with the same reference symbols or the same component symbols.

A preferred exemplary embodiment of the subject matter of the invention with some additional optional features is described below in conjunction with the attached drawings.

Figure 1:
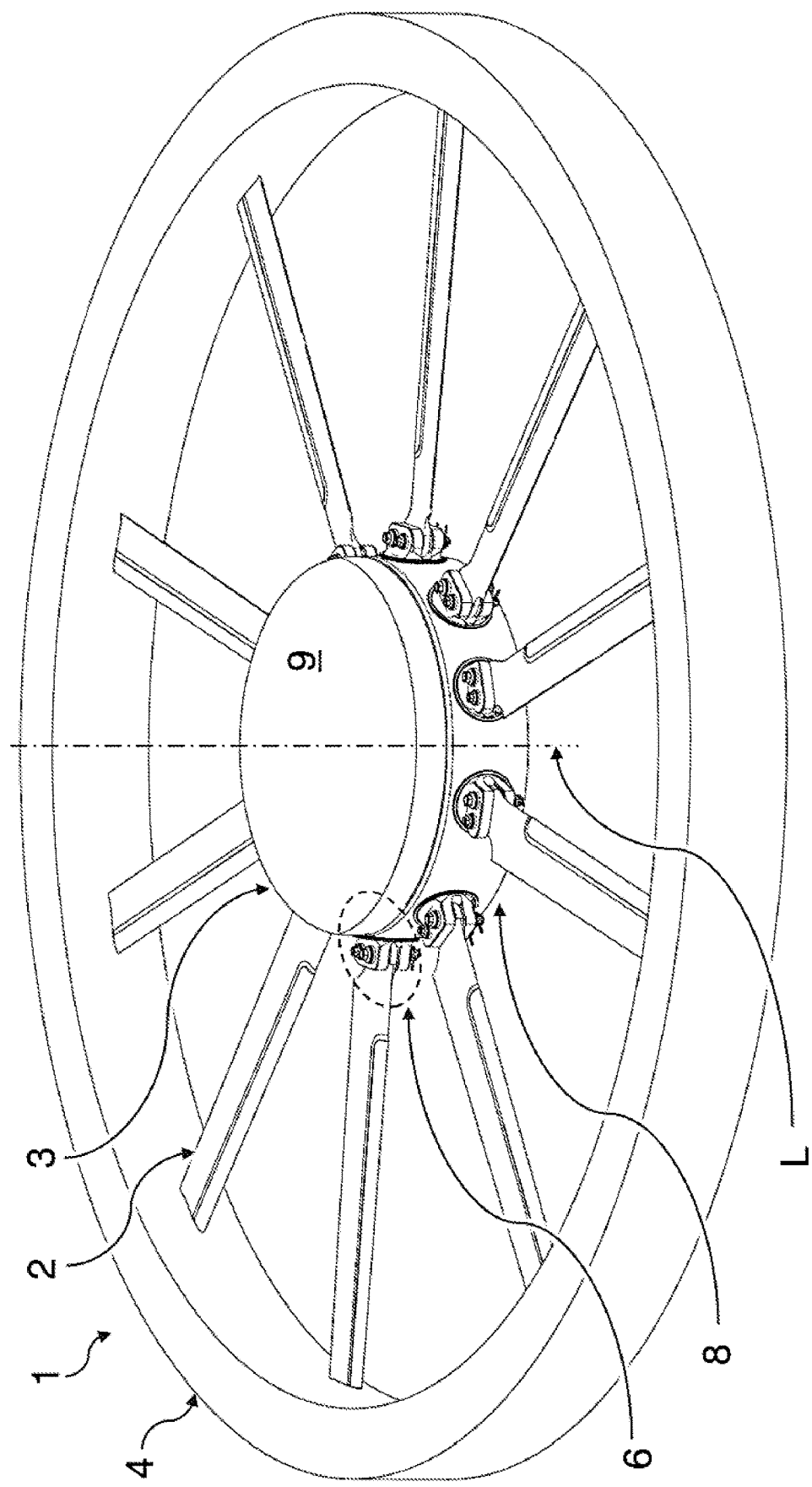
Figure 2A:
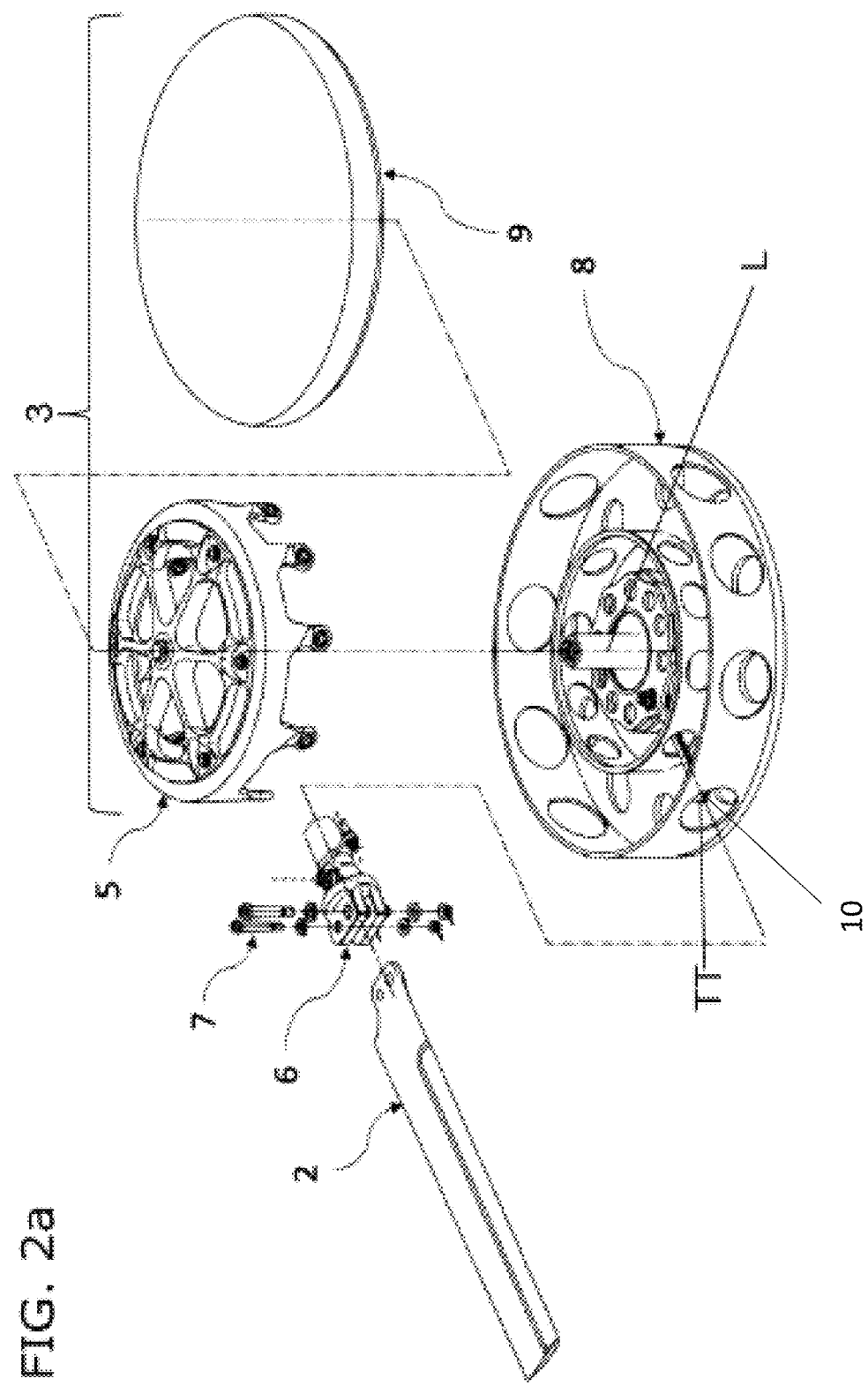
Figure 2B:
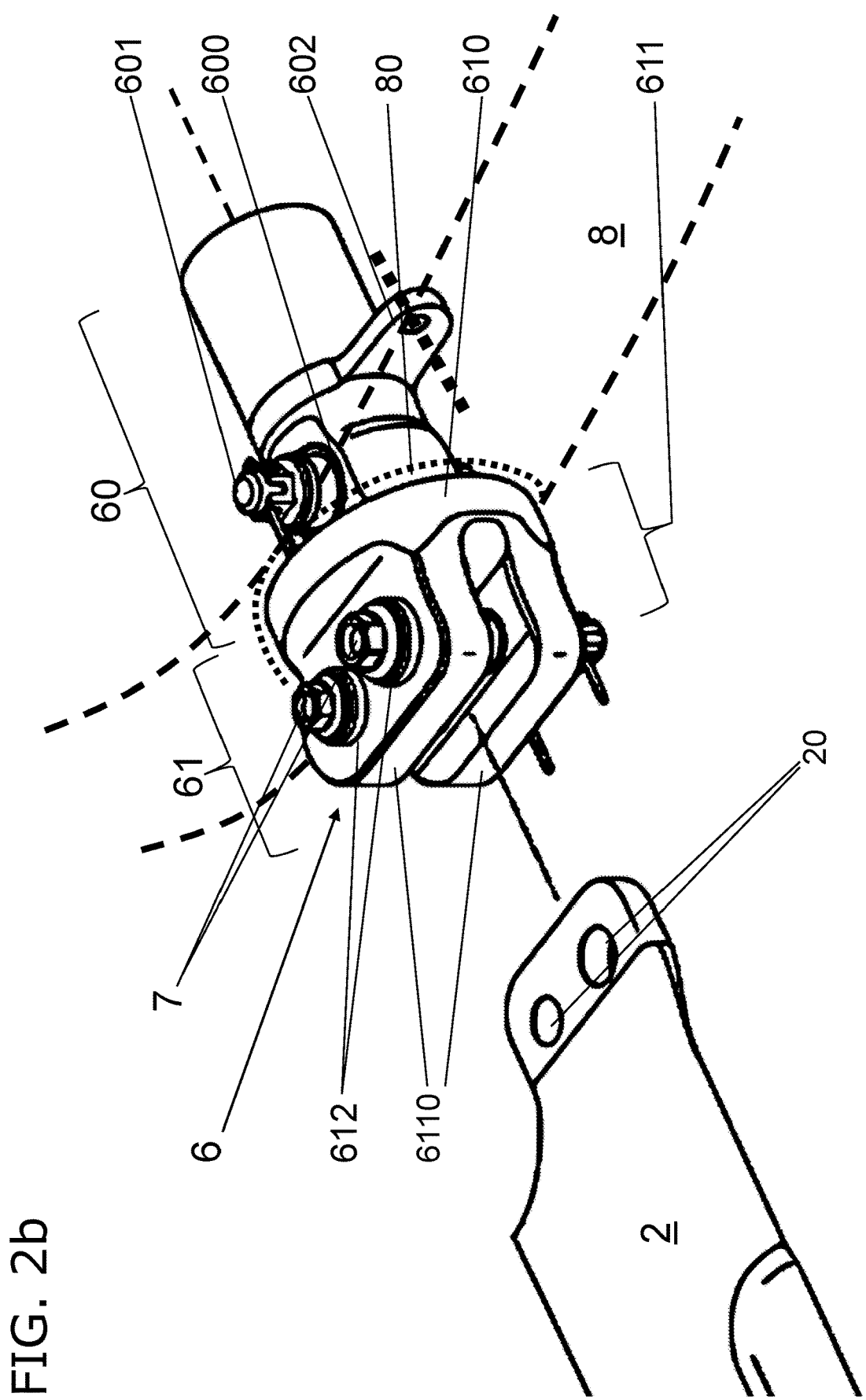
Figure 3A:
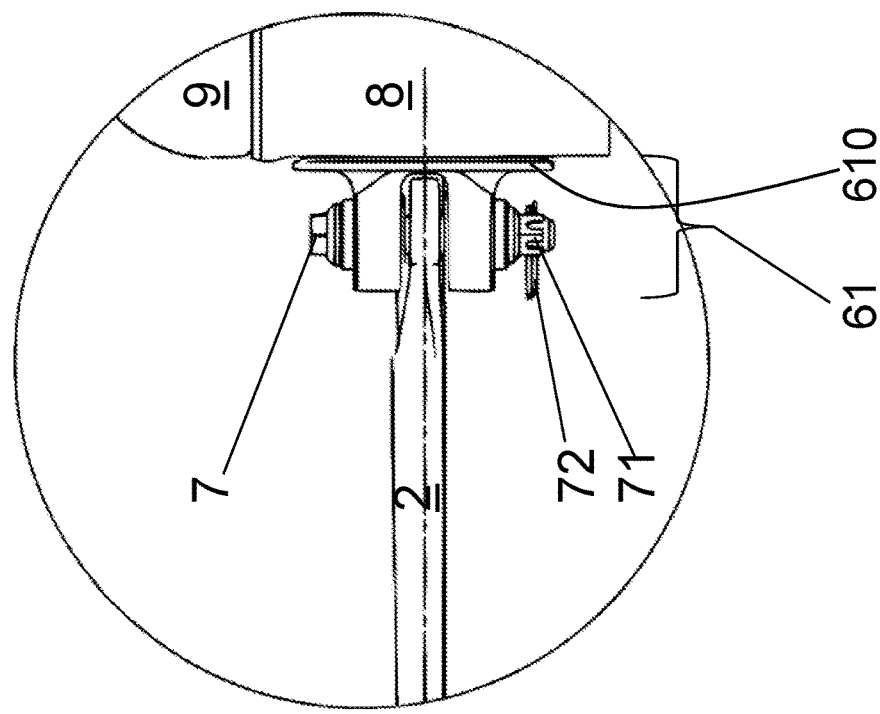
Figure 3B:
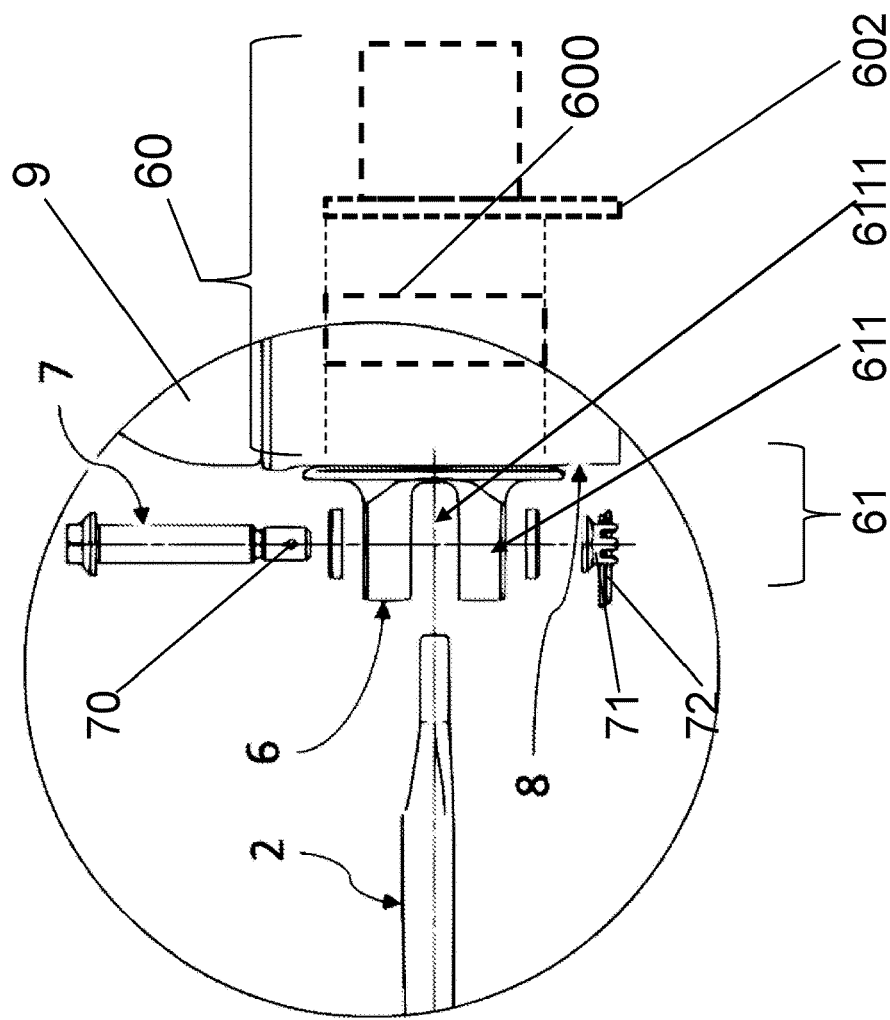
Figure 5:
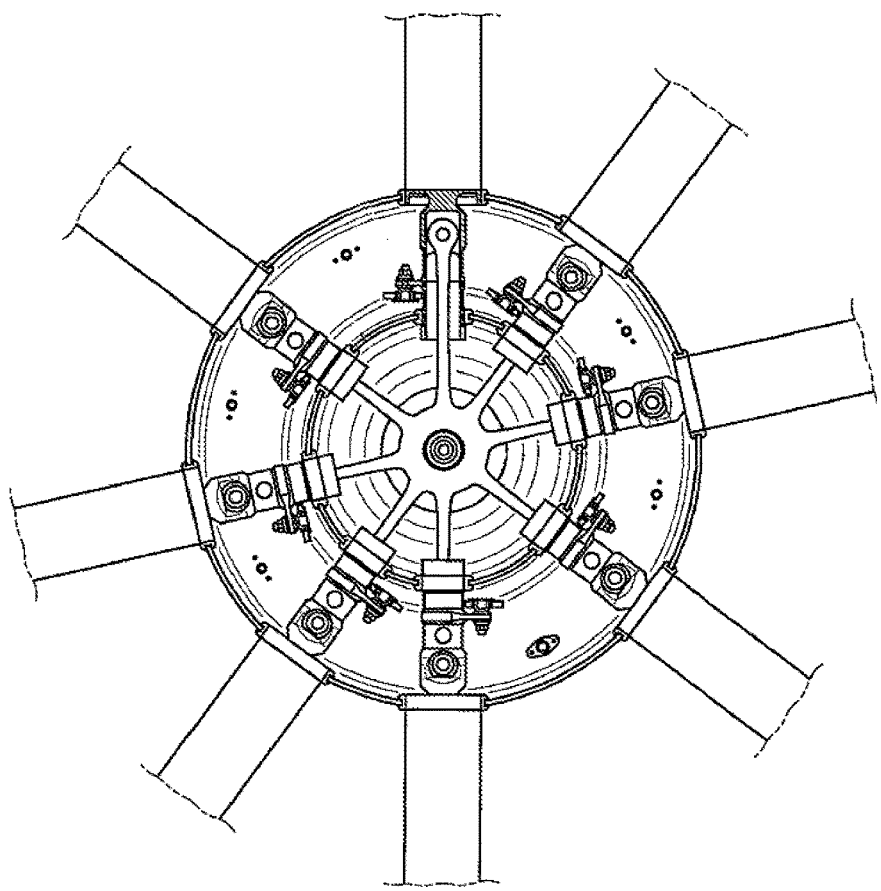
Figure 4:
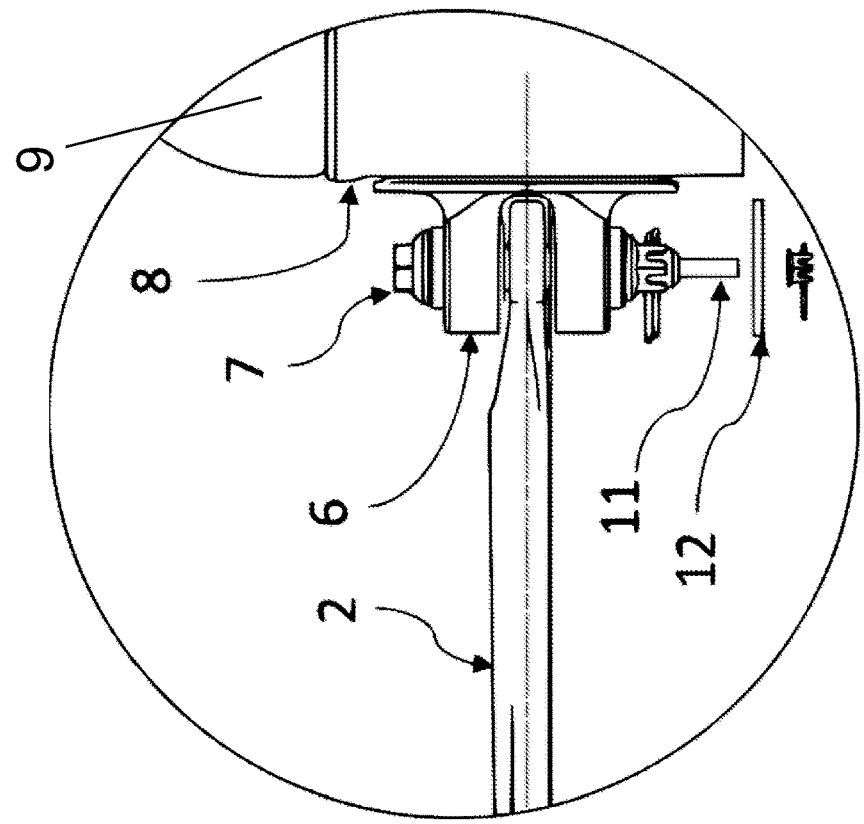

FIG. 1 depicts a perspective view of a tail rotor of a rotary wing aircraft partly covered by a shroud;

FIG. 2a depicts an explosive view of a tail rotor with partly deconstructed tail rotor head, a tail rotor blade and a tail rotor blade attachment device;

FIG. 2b depicts a detailed view of a part of a tail rotor blade the tail rotor blade attachment device according FIG. 2a;

FIG. 3a depicts an explosion view of a blade before connection to the tail rotor blade attachment device;

FIG. 3b depicts a connected tail rotor blade in a side view;

FIG. 4 depicts a tail rotor blade attachment device in a side view, wherein balancing with appropriate means is shown; and FIG. 5 depicts prior art FIG. 9 from EP3315403.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that at least one of "A, B, and C" should not be understood as including only one of A, only one of B, only one of C, or any combination of A, B, and C.

A shrouded tail rotor 1 of a rotary wing aircraft is shown in FIG. 1. As depicted, a circumferential shroud 4 is shown enveloped and spaced apart from the axis of rotation L. In the center of the tail rotor 1, a tail rotor head 3 comprising a multiplicity of parts is shown, here only a hub 8 and a covering hub cap 9 being visible. A multiplicity of tail rotor blade attachment devices 6 or blade holders 6 is attached to the tail rotor head 3. Tail rotor blades 2 are directly attached to the blade holders 6 and therewith indirectly with the tail rotor head 3. The shape of the blade holder 6 and the location of the blade holder 6 guarantees the advantageous features of the here described invention.

The exploded view of FIG. 2a shows the components in more detail, whereby and by way of example, only the attachment of one rotor blade 2 by means of one blade holder 6 over a tension torsion strap TT on the tail rotor hub 8 and a pitch control unit 5 of the tail rotor head 3 is shown. A signal from a control system of the rotary wing aircraft is transferred via the pitch control unit 5 to the tail rotor blades 2.

The tail rotor head 3 is at least formed by the hub cap 9, the pitch control unit 5, the tail rotor hub 8 and a number of tension torsion straps TT, according to the later attached blade holder/tail rotor blade attachment devices 6 and tail rotor blades 2. Alternatively, use may be made of a tension torsion element.

The tension torsion straps TT are fixed with one connection eye 10 at the hub 8, each protruding through an assigned hole in the hub 8. The hub 8 provides support for the blade holder 6.

The pitch control unit 5 is placed inside the hub 8, exhibiting connecting links for connecting a part of the tail rotor blade attachment devices or blade holder 6. The pitch control unit 5 also includes openings or recesses, such that the blade holder 6 can protrude in radial direction.

Each blade holder 6 is connectable at an assigned tension torsion strap TT and an assigned link at the pitch control unit 5. After attachment of the blade holder 6 indirectly at the hub 8, the hub cap 9 is covering the hub 8. A part of the blade holder 6 protrudes from the hub 8. With two bolts 7, the tail rotor blade 2 may be fixed at their assigned blade holder 6. At least one bolt 7 is necessary.

The blade holder 6 comprises a strap holding part 60 and a blade holding part 61, which are moulded together at a linear distance from one another. The strap holding part 60 has a tube-like shape and on a first side a connection bore 600 is recessed, which allows a strap holding bolt 601 to be passed through. In practice, the strap holding part 60 is put over the tension torsion strap TT, not depicted in FIG. 2b. With the strap holding bolt 601, the tension torsion strap TT is detachably connected to the blade holder 6. With a pitch horn 602 at the strap holding part 60, the blade holder 6 is detachably connected to the pitch control unit 5, thereby providing or allowing for transmission of rotary movements from the pitch control unit 5 to the blade holder 6. Additionally, this connection can also be achieved by a screw connection.

As depicted in FIG. 2b, the wall of the hub 8 includes an opening 80 through which the blade holder 6 is fed. While the strap holding part 60 is laying completely inside the tail rotor hub 8, the blade holding part 61 is protruding completely out of the hub 8. The blade holding part 61, comprises a flange 610 with a disc-like shape and an integrally formed mounting bracket 611 with two parallel bracket arms 6110. The flange 610 is moulded to the strap holding part 60 and forms part of the blade holding part 61, merging into the strap holding part 60. The circumference of the flange 610 is adapted to the opening 80 in the tail rotor hub 8.

In the mounting bracket 611 of the blade holding part 61, fully traversing bores 612 are arranged, through which the blade bolts 7 can reach. Of course, corresponding through holes 20 must be arranged on each tail rotor blade 2. By using two blade bolts 7, an anti-twist connection is possible, because the tail rotor blade 2 cannot rotate relative to the blade holder 6 and therewith relative to the hub 8, the connection between blade 2 and blade holder 6 is fixed. The blade holder 6 itself can rotate around its longitudinal axis, aligned with centrifugal force direction. Relatively to the tail rotor hub 8, the tail rotor blade 2 can and must rotate in blade pitch for thrust control of the rotary wing aircraft.

In FIG. 3a the connection of the tail rotor blade 2 with the blade holder 6 and therewith, indirectly with the tail rotor hub 8 is shown. Even with connected hub cap 9, the blade holding part 61 of the tail rotor blade holder 6 is reachable outside of the tail rotor hub 8 and a blade 2 can be easily replaced by simply removing the two blade bolts 7. Beside the bolt and nut connection by the two blade bolts 7, a plug connection with a split pin 72 at each blade bolt 7 can additionally be fixed. Accordingly, a suitable blade bolt 7 with a bore 70 and a suitable split pin receptacle 71 must be used if the additional securing split pin connection is used.

Each blade bolt 7 is inserted between the bracket arms 6110 of the mounting bracket 611, reaching through a bracket interior 6111.

The connected and securely attached tail rotor blade 2 at a blade holder 6 and indirectly connected at the tail rotor hub 8 is shown in FIG. 3b in more detail. The tail rotor blade 2 is formed in such a way that it is fully inserted into tan interior 6111 of the mounting bracket 611 of the blade holding part 61 and held there by the at least one blade bolt 7 and/or the additional detachable split pin connection with at least one blade bolt 7, and preferably two blade bolts 7, should be used.

Optionally, the at least one blade bolt 7 can be equipped with weight attachment means 11 to connect a balancing weight 12. Such balancing weights 12 are used to balance the tail rotor head 3, respectively the tail rotor 1, after installation of all tail rotor blades 2 at the tail rotor hub 8.

The weight attachment means 11 may be, for example, an extension at the blade bolt 7 that enables and/or allows installation of at least one balancing weight 12. Usually, one or more symmetrical bodies with concentric through-hole are used as weights 12. Such a balancing weight 12 may be a washer. Here the blade bolt 7 has a prolonged cylindrical section, at which, again, with a detachable split pin connection, one or more balancing weights 12 may be attached. The balancing weights 12 may also be attached with a nut.

The tail rotor blade attachment device 6 or blade holder 6 is to be formed such that the blade holding part 61 may hold the tail rotor blade 2 independently from the strap holding part 60 which holds the tension torsion strap TT. Therewith, a removal of the tail rotor blade 2, independently from the rest of the parts, without removing many other parts, is possible. The stick out of the blade holding part 61 from the tail rotor hub 8 leads to a very easy access. An optimized fast coupling of the at least one blade bolt 7 to the blade holder 6 is useful, just as the creation of a simple balancing method. Sufficient stability and strength of connections especially in the helicopter area is provided.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

The invention claimed is:

1. A tail rotor head of a shrouded tail rotor for a rotary wing aircraft, comprising:
   at least a pitch control unit;
   a tail rotor hub comprising an inner cylindrical wall and an outer cylindrical wall coaxial with the inner cylindrical wall, the inner cylindrical wall comprising a first plurality of openings, the outer cylindrical wall comprising a second plurality of openings, wherein each of the first plurality of openings is aligned with one of the second plurality of openings,
   a plurality of tail rotor blade holders arranged extending through the first and second plurality of openings and the pitch control unit,
   wherein for each of the plurality of tail rotor blade holders:
   a tail rotor blade is detachably connected to a blade holding part of the tail rotor blade holder;
   a tension torsion strap is detachably mounted holder to a strap holding part of the tail rotor blade holder, the strap holding part and the blade holding part being arranged at a linear distance from one another on the tail rotor blade holder,
   wherein the tension torsion strap is arranged to run from the tail rotor head, at least partly through the tail rotor blade holder, and radially outward in a direction of the tail rotor blade;
   wherein the tension torsion strap is arranged fixed in the strap holding part by a strap holding bolt, while one end of the tail rotor blade is detachably fixed independently and spaced apart from the tension torsion strap in a bracket interior of a mounting bracket with at least one blade bolt passing a bore in the blade holding part;
   wherein the blade holding part is located outside of the tail rotor hub, and
   wherein the blade holding part further comprises a flange arranged abutting to the strap holding part, the flange comprising a circumference adapted to an opening in the tail rotor hub.

2. The tail rotor head according claim 1, wherein the blade is fixed at the mounting bracket by the at least one blade bolt, the at least one blade bolt comprising a bore, a split pin receptacle and a split pin, forming a detachable split pin connection, independent of the fixing of the tension torsion strap at the strap holding part from outside of the tail rotor hub.

3. The tail rotor head according to claim 2, wherein the at least one blade bolt comprises two blade bolts are configured for use as an attachment of the blade and secured against twisting relatively to the tail rotor blade attachment device.

4. The tail rotor head according to claim 3, wherein each of the at least one blade bolt comprises a weight attachment means and at least one balancing weight arranged for easy balancing of the tail rotor hub after installation of the tail rotor blades at the tail rotor hub.

5. The tail rotor head according to claim 4, wherein the weight attachment means is a prolonged cylindrical section at each of the at least one blade bolt.

6. The tail rotor head according to claim 4, wherein the at least one balancing weight is secured by a detachable split pin connection at the blade bolt.

7. The tail rotor head according to claim 5, wherein the at least one balancing weight is secured by a detachable split pin connection at the blade bolt.

8. A tail rotor head of a shrouded tail rotor for a rotary wing aircraft, comprising:
   at least a pitch control unit;
   a tail rotor hub comprising openings, wherein the pitch control unit is placed inside the tail rotor hub;
   a plurality of tail rotor blade holders arranged extending through the openings and the pitch control unit, and
   a hub cap covering the pitch control unit and the tail rotor hub,
   wherein for each of the plurality of tail rotor blade holders:
   a tail rotor blade is detachably connected to a blade holding part of the tail rotor blade holder;
   a tension torsion strap is detachably mounted holder to a strap holding part of the tail rotor blade holder, the strap holding part and the blade holding part being arranged at a linear distance from one another on the tail rotor blade holder,
   wherein the tension torsion strap is arranged to run from the tail rotor head, at least partly through the tail rotor blade holder, and radially outward in a direction of the tail rotor blade;
   wherein the tension torsion strap is arranged fixed in the strap holding part by a strap holding bolt, while one end of the tail rotor blade is detachably fixed independently and spaced apart from the tension torsion strap in a bracket interior of a mounting bracket with at least one blade bolt passing a bore in the blade holding part;
   wherein the blade holding part is located outside of the tail rotor hub and the hub cover, and
   wherein the blade holding part further comprises a flange arranged abutting to the strap holding part, the flange comprising a circumference adapted to an opening in the tail rotor hub.

* * * * *